United States Patent
Fernando et al.

(10) Patent No.: US 10,703,373 B2
(45) Date of Patent: Jul. 7, 2020

(54) VEHICLE VELOCITY CONTROL

(71) Applicant: Ford Global Technologies, LLC, Dearborn, MI (US)

(72) Inventors: Raveen Fernando, State College, PA (US); Barnabas Joseph Nemec, Dearborn, MI (US); Michael Adel Awad Alla, Novi, MI (US); Tsung-Han Tsai, Pittsfield Township, MI (US); Kathryn Hamilton, West Bloomfield, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/111,658

(22) Filed: Aug. 24, 2018

(65) Prior Publication Data

US 2020/0062255 A1 Feb. 27, 2020

(51) Int. Cl.
   *B60W 30/188* (2012.01)

(52) U.S. Cl.
   CPC ....... *B60W 30/188* (2013.01); *B60W 2552/15* (2020.02); *B60W 2552/30* (2020.02); *B60W 2552/40* (2020.02); *B60W 2554/80* (2020.02)

(58) Field of Classification Search
   CPC .................. B60W 30/188; B60W 2550/30
   See application file for complete search history.

(56) References Cited

U.S. PATENT DOCUMENTS

| | | | |
|---|---|---|---|
| 5,053,979 | A | 10/1991 | Etoh |
| 5,396,426 | A | 3/1995 | Hibino et al. |
| 8,676,443 | B2 | 3/2014 | Han et al. |
| 8,751,134 | B2 | 6/2014 | Dorenkamp et al. |
| 8,818,681 | B1 | 8/2014 | Dolgov et al. |
| 8,818,682 | B1 | 8/2014 | Dolgov et al. |
| 8,831,813 | B1 | 9/2014 | Ferguson et al. |
| 8,914,225 | B2 | 12/2014 | Caskey et al. |
| 9,187,117 | B2 | 11/2015 | Spero et al. |
| 9,272,711 | B1 | 3/2016 | Sivaraman |
| 9,616,888 | B2 | 4/2017 | Pilutti et al. |
| 9,880,557 | B1 | 1/2018 | Dolgov et al. |

(Continued)

FOREIGN PATENT DOCUMENTS

| | | |
|---|---|---|
| CN | 104281080 A | 8/2015 |
| DE | 102016119698 A | 4/2017 |

(Continued)

OTHER PUBLICATIONS

Paul Ingrassia, Reuters Technology News, "Look No Hand Test Driving a Google Car", Aug. 17, 2014 retrieved from Internet URL: https://uk.reuters.com/article/us-google-driverless/look-no-hands-test-driving-a-google-car (7 pages).

(Continued)

*Primary Examiner* — Alan D Hutchinson
*Assistant Examiner* — Andy Schneider
(74) *Attorney, Agent, or Firm* — Frank A. MacKenzie; Bejin Bieneman PLC (57) ABSTRACT

A first vehicle velocity target is determined based on a velocity of a proximate second vehicle and at least one of a curvature of a road, a gradient of the road, a bank angle of the road, visibility, and a coefficient of friction on a surface of the road.

14 Claims, 3 Drawing Sheets

(56) References Cited

U.S. PATENT DOCUMENTS

| | | | |
|---|---|---|---|
| 2013/0297196 A1* | 11/2013 | Shida | B60W 30/143 |
| | | | 701/119 |
| 2013/0345944 A1 | 12/2013 | Kasiraj et al. | |
| 2015/0151725 A1* | 6/2015 | Clarke | B60W 30/00 |
| | | | 701/28 |
| 2016/0200318 A1 | 7/2016 | Parikh et al. | |

FOREIGN PATENT DOCUMENTS

| | | |
|---|---|---|
| JP | 2017165153 A | 9/2017 |
| WO | 2017215907 A1 | 12/2017 |

OTHER PUBLICATIONS

Joe Miller, BBC Technology Reporter, "Google Driverless Cars Designed to Exceed Speed Limit", Aug. 19, 2014, retrieved from Internet URL: http://www.bbc.com/news/echnology-28851996 (3 pages).

* cited by examiner

VEHICLE VELOCITY CONTROL

BACKGROUND

Autonomous and partially autonomous vehicles can perform operations such as setting or maintaining a vehicle velocity, following a particular route, and maintaining a specified distance from other vehicles. A vehicle velocity can be set and maintained according to user input and/or based on a reference vehicle, typically an immediately preceding vehicle. However, a vehicle's set point or target velocity may not reflect current conditions, e.g., pertaining to a road, traffic, an environment around the vehicle, etc.

DETAILED DESCRIPTION

A method comprises controlling a first vehicle velocity based on a velocity of a second vehicle and at least one of a curvature of a road, a gradient of the road, a bank angle of the road, visibility, or a coefficient of friction on a surface of the road.

An example implementation includes determining a first vehicle velocity target further based on a location of the second vehicle relative to the first vehicle.

An example implementation includes determining a first vehicle velocity target based on a velocity of a third vehicle in addition to the velocity of the second vehicle. Each of the second vehicle and the third vehicle can be in a same lane as the first vehicle. The second vehicle can be in a same lane as the first vehicle and the third vehicle is in a different lane than the first vehicle.

The second vehicle can be one of a plurality of second vehicles. An example implementation includes assigning respective weights to each of the second vehicles according to a respective location relative to the first vehicle of each second vehicle. The example implementation can further include identifying one of the second vehicles as an immediately forward vehicle, and increasing the weight assigned to the immediately forward vehicle based on at least one of the curvature of the road, the gradient of the road, the bank angle of the road, visibility, or the coefficient of friction on the surface of the road. Further in this example the first vehicle velocity can be controlled according to a target speed determined by the following equation:

$$\text{target speed} = \Sigma_{i=1 \text{ to } n} \text{speed}_{vehicle_i} * \text{weight}_{vehicle_i},$$

wherein i specifies a number of second vehicles, $\text{speed}_{vehicle_i}$ represents the speed of an $i_{th}$ vehicle, and $\text{weight}_{vehicle_i}$ is the weight assigned to the $i_{th}$ vehicle. The example can further include identifying one of the second vehicle as being in an adjacent lane, and setting the weight assigned to the identified second vehicle in the adjacent lane to zero upon determining that a difference between a speed of the first vehicle and a speed of the identified second vehicle exceeds a predetermined threshold.

A computer comprises a processor and a memory, the memory storing instructions executable by the processor for controlling a first vehicle velocity based on a velocity of a second vehicle and at least one of a curvature of a road, a gradient of the road, a bank angle of the road, visibility, or a coefficient of friction on a surface of the road.

The instructions can further comprise instructions for determining a first vehicle velocity target further based on a location of the second vehicle relative to the first vehicle.

The instructions can further comprise instructions for determining a first vehicle velocity target based on a velocity of a third vehicle in addition to the velocity of the second vehicle. Each of the second vehicle and the third vehicle can be in a same lane as the first vehicle. The second vehicle can be in a same lane as the first vehicle and the third vehicle is in a different lane than the first vehicle.

The second vehicle can be one of a plurality of second vehicles. The instructions can further comprise instructions for assigning respective weights to each of the second vehicles according to a respective location relative to the first vehicle of each second vehicle. The instructions can further comprise instructions for identifying one of the second vehicles as an immediately forward vehicle, and increasing the weight assigned to the immediately forward vehicle on the at least one of the curvature of the road, the gradient of the road, the bank angle of the road, visibility, or the coefficient of friction on the surface of the road. The first vehicle velocity can be controlled according to a target speed determined by the following equation:

$$\text{target speed} = \Sigma_{i=1 \text{ to } n} \text{speed}_{vehicle_i} * \text{weight}_{vehicle_i},$$

wherein i specifies a number of second vehicles, $\text{speed}_{vehicle_i}$ represents the speed of an $i_{th}$ vehicle, and $\text{weight}_{vehicle_i}$ is the weight assigned to the $i_{th}$ vehicle. The instructions can further comprise instructions for identifying one of the second vehicle as being in an adjacent lane, and setting the weight assigned to the identified second vehicle in the adjacent lane to zero upon determining that a difference between a speed of the first vehicle and a speed of the identified second vehicle exceeds a predetermined threshold.

An approach to controlling a host or ego vehicle velocity includes monitoring the velocity(s) of one or more nearby vehicles and setting the host vehicle velocity accordingly. An example vehicle system capable of setting host vehicle velocity as disclosed herein includes a sensor that detects a velocity of at least one proximate (as that term is defined below) vehicle. The vehicle system further includes a computer programmed to set a target velocity for the host vehicle based on velocities of one or more proximate vehicles, and environmental conditions. The computer can be further programmed to generate a command to control a host vehicle in accordance with the target (or set point) velocity.

Figure 1:
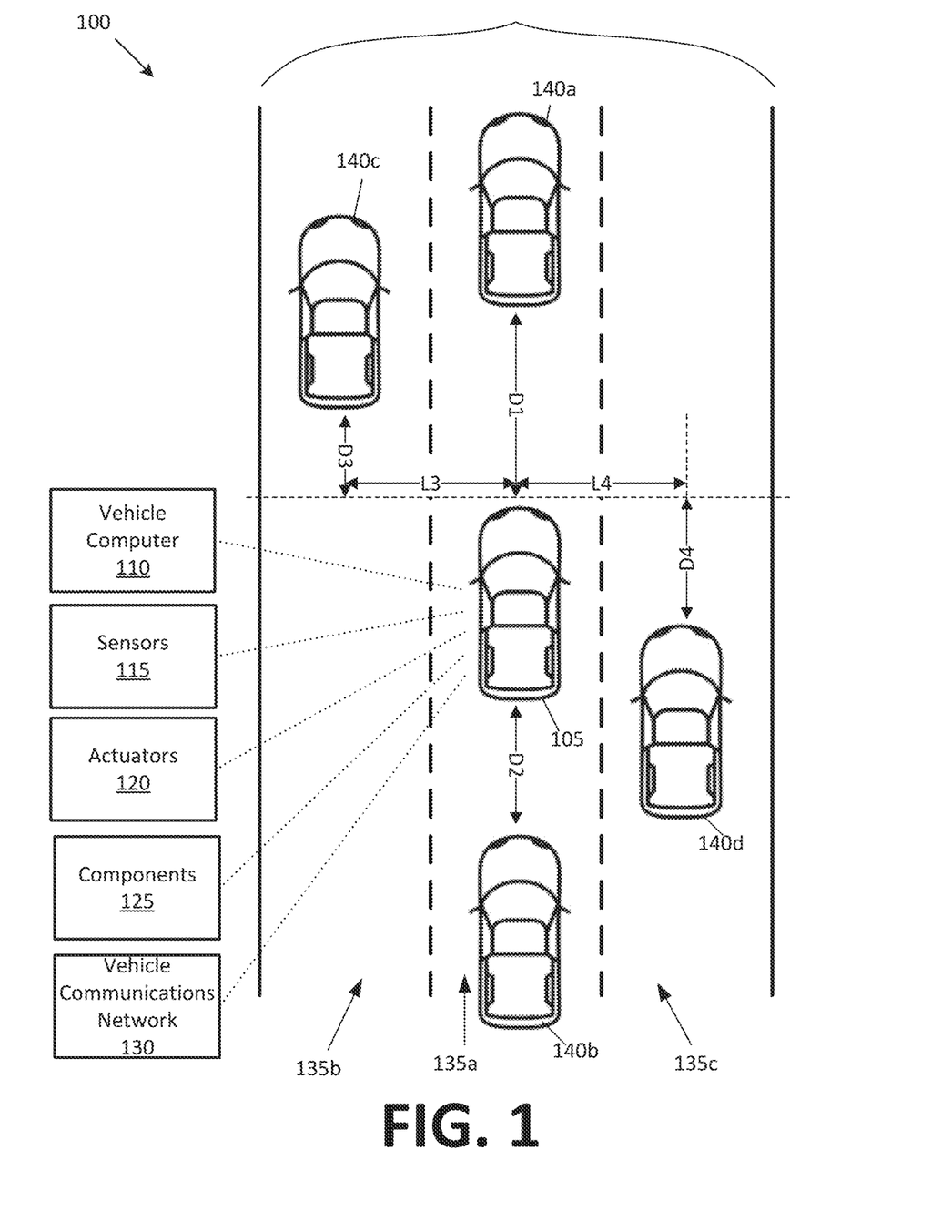
FIG. 1 is a diagram illustrating a traffic scene including a vehicle including the example vehicle velocity control system on a road.

FIG. 1 is a diagram illustrating an example vehicle velocity control system 100 that controls the velocity of a host vehicle 105 according to the velocities of proximate vehicles 140a, 140b, 140c, 140d (collectively referred to as vehicles 140) and environmental conditions. As discussed in greater detail below, the system 100 may detect the velocities of proximate vehicles 140. A detected vehicle 140 velocity may be a velocity of a proximate vehicle 140 (i.e., a vehicle 140 in front of, behind, or to the side, of the host vehicle 105 with no other intervening vehicles). From a weighted average of the detected velocities of multiple proximate vehicles 140, the system 100 may determine a target velocity of the host vehicle 105, and generate a command to control the host vehicle 105 to attain and/or maintain the target velocity (sometimes referred to as a set point velocity). Although illustrated as a sedan, the host vehicle 105 could be any type of powered land vehicle with two or more wheels.

The host vehicle 105 includes a vehicle computer 110, sensors 115, actuators 120 to actuate various vehicle components 125, and a vehicle communications network 130. The computer 110 includes a processor and a memory such as are known. The memory includes one or more forms of computer-readable media, and stores instructions executable by the computer 110 for performing various operations, including as disclosed herein.

The computer 110 may operate the host vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the host vehicle 105 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 communications network 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. The computer 110 is generally arranged for communications on the vehicle communications network 130 that can include a bus in the vehicle 105 such as a controller area network (CAN) or the like, and/or other wired and/or wireless mechanisms.

The computer 110 may represent any number of computing devices collectively arranged or distributed and programmed to a target velocity for the vehicle 105, and to generate a command to control the vehicle 105 in accordance with the target velocity. The target velocity may be based on the velocities and locations of proximate vehicles 140, and/or environmental conditions such as road friction, road curvature, visibility, road slope and/or road bank angle. Determining target velocity based on environmental conditions, e.g., according to an environmental conditions adjustment factor, is discussed below.

Via the vehicle 105 communications network 130, the computer 110 may transmit messages to various devices in the host vehicle 105 and/or receive messages from the various devices, e.g., sensors 115, an actuator 120, a human machine interface (HMI), etc. Alternatively or additionally, in cases where the computer 110 actually comprises a plurality of devices, the vehicle 105 communications network 130 may be used for communications between devices represented as the computer 110 in this disclosure. Further, as mentioned below, various controllers and/or sensors 115 may provide data to the computer 110 via the vehicle 105 communications network 130.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115, e.g., fixed to vehicle 105 bumpers may provide data related to the objects, such as distances and/or velocities of proximate vehicles 140 (which alternatively or additionally could be inferred from camera or LIDAR sensor 115 data). The sensors 115 may further include camera sensor(s) 115, e.g. front view, side view, etc., providing images from an area surrounding the vehicle 105. As an example, the sensors 115 may detect posted velocity limits. As another example, the sensors 115 may detect lane markings and/or other boundaries or indicators marked on a road 145.

The vehicle 105 actuators 120 are implemented via circuits, chips, or other electronic and or mechanical components that can actuate various vehicle subsystems in accordance with appropriate controls as is known. The actuators 120 may be used to control components 125, including braking, acceleration, and steering of the host vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a wireless communication network with devices outside of the vehicle 105, e.g., through wireless vehicular communication (e.g., vehicle-to-vehicle (V2V) communication, vehicle-to-infrastructure (V2I or V2X) communication, vehicle-to-cloud (V2C) communication, etc.), to an infrastructure node (typically via direct radio frequency communications) and/or (typically via a network) a remote (i.e., external to the vehicle 105 and in a geographic location out of a line of sight of the vehicle 105) server. The wireless network could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the wireless network include cellular, Bluetooth®, IEEE 802.11, dedicated short range communications (DSRC), and/or wide area networks (WAN), including the Internet, providing data communication services.

Figure 2:
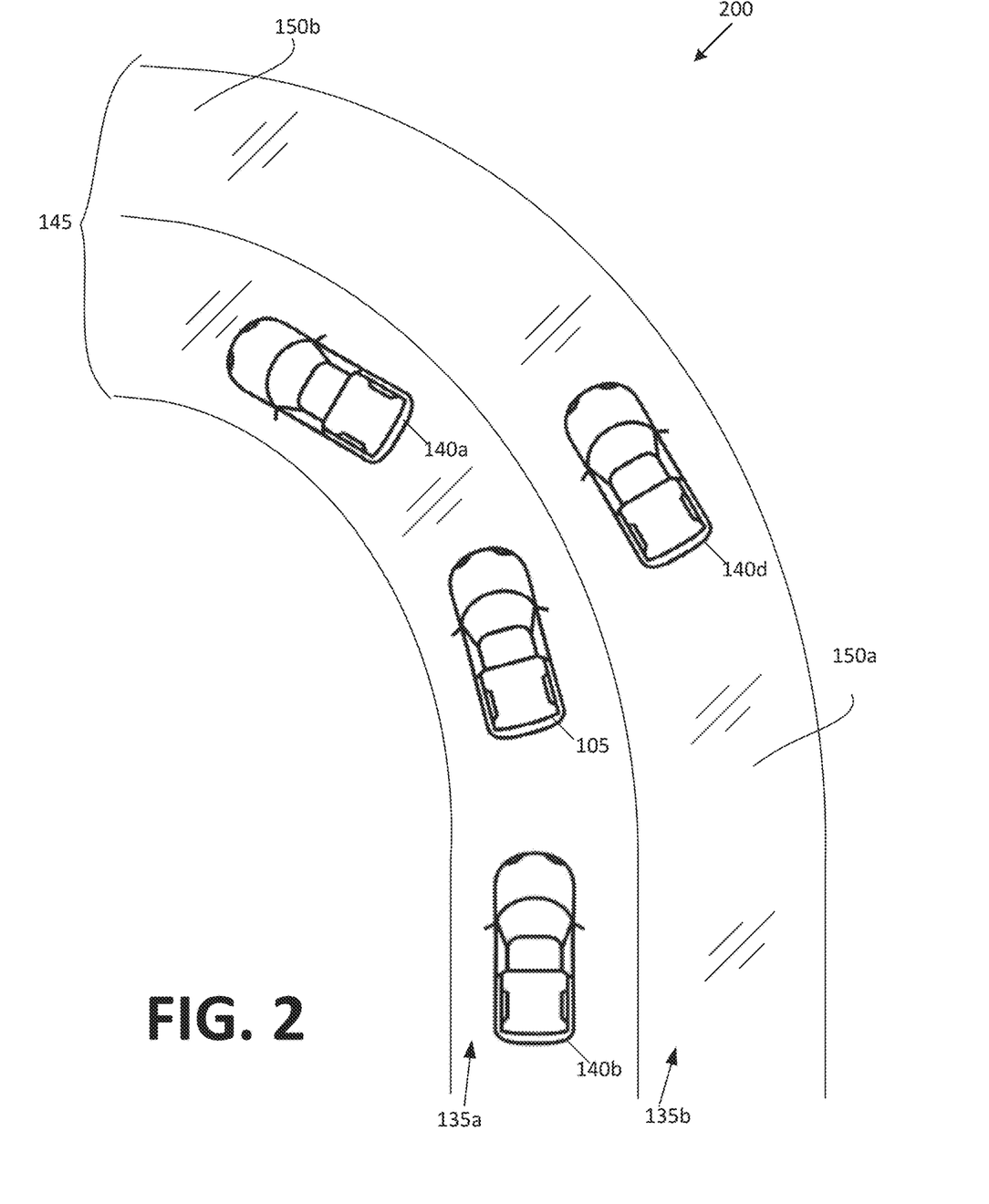
FIG. 2 is a diagram illustrating another example traffic scene.

As seen in FIGS. 1 and 2, lanes 135 of a road 145 allow vehicles 105, 140 to travel in a same direction as one another. The computer 110 may be programmed to determine the host vehicle 105 target velocity in accordance with detected velocities and/or locations of proximate vehicles 140. For purposes of the present disclosure a proximate vehicle 140 to the host vehicle 105 is a vehicle 140 that is within a predetermined longitudinal distance of the host vehicle 105. That is, a proximate vehicle 140 could be in a same lane as the host vehicle 105, in which case a lateral distance would be effectively zero or minimal, or the proximate vehicle 140 could be in an adjacent lane to the host vehicle 105, in which case the lateral distance would be a positive or negative value, but in any of these cases, the vehicle 140 would be determined to be proximate if the longitudinal distance was within a predetermined threshold. Further, it is possible that different longitudinal distance thresholds could be specified for different lanes, e.g., a longitudinal distance threshold could be longer for a vehicle 140 in a same lane of travel as the host vehicle 105, and shorter for a vehicle 140 in an adjacent lane of travel.

The following formula can be used to determine a target velocity for a host vehicle 105, considering respective velocities of n proximate vehicles 140, each vehicle 140 velocity being assigned a respective weight.

$$\text{target speed} = \Sigma_{i=1 \ to \ n} \text{speed}_{vehicle_i} * \text{Weight}_{vehicle_i} \quad (1)$$

Note that equation (1) depends on at least one proximate vehicle 140, i.e., if no vehicles 140 are within a threshold distance of the vehicle 105, then the target speed must be determined other than by equation (1). For example, a vehicle computer 110 could be programmed to alternatively establish a target velocity according to a posted speed limit and/or environmental and road conditions. Further, as explained below and as seen in equation (2) below, the target speed can be determined by an environmental condition adjustment factor, or environment factor, in addition to speeds or velocities of proximate vehicles 140. Typically, the environmental condition adjustment factor is used to increase the weight assigned to a vehicle 140 immediately ahead of the host vehicle 105 in a same lane of travel as the host vehicle 105. The environmental condition adjustment factor typically reflects degraded environmental conditions, e.g., poor visibility, reduced road friction, etc., and therefore indicates a situation in which a vehicle 140 immediately ahead of the host vehicle 105 is more likely to be indicative of a safe travel speed.

The computer 110 may be programmed to determine the weight, i.e., a weighting factor, for each proximate vehicle 140 based on a relative position of the proximate vehicle 140 to the host vehicle 105, e.g., a lane in which the proximate vehicle 140 is travelling. Example lanes 135 may include a same lane 135a, i.e., a current lane of travel of the vehicle 105, adjacent lanes 135b, 135c, and non-adjacent lanes. Adjacent lanes 135b, 135c are lanes immediately to the left or right of the vehicle 105. Non-adjacent lanes are any other lanes on the road 145 that are not adjacent lanes 135 or a same lane as the vehicle 105 current lane 135.

A relative location of a proximate vehicle 140 to the host vehicle 105 can be determined by using sensor 115 data to detect a lateral and a longitudinal distance of the vehicle 140 from the vehicle 105. A longitudinal distance in the present context (e.g., illustrated by the distances D1, D2, D3, D4) is a distance along or parallel to a longitudinal axis of the vehicle 105 from a specified point on a vehicle 105, e.g., on a front or rear bumper, to a lateral axis extending from a proximate vehicle 140, e.g., a lateral axis through a point on an edge of a front or rear bumper of the vehicle 140. A lateral distance from the vehicle 105 (illustrated by L3, L4) in the present context is a distance extending perpendicular to the host vehicle 105 longitudinal axis, e.g., measured from a left or right side of the host vehicle 105, to a longitudinal axis of a respective proximate vehicle 140, e.g., to a longitudinal axis through a point on a side of the vehicle 140. A lateral distance can be used to determine a lane 135 in which a vehicle 140 is traveling.

The computer 110 may also determine respective velocities of each proximate vehicle 140, e.g., using radar sensors 115, ultrasound sensors 115, etc. For example, a vehicle 140 velocity can be determined as a velocity relative to a velocity of the vehicle 105.

Based on velocities and distances of proximate vehicles 140 (interchangeably referred to in the equations and description below as vehicles$_i$), weights can be assigned to proximate vehicles 140 according to the following function:

$$\text{weight}_{vehicle_i} = f(\vec{\Delta v_i}, \vec{\Delta d_i}, \text{Environment Factor}) \quad (2)$$

where $\vec{\Delta v_i}$=relative difference in velocity between vehicle$_i$ and the vehicle 105;

$\vec{\Delta d_i}$=the relative difference in position, i.e., distance, between vehicle$_i$ and the vehicle 105; and the environment factor is determined as explained below, and can be used to increase a weight assigned to a vehicle 140 immediately ahead of the host vehicle 105 in a same lane as the host vehicle 105, and to reduce weights assigned to other vehicles 140.

Further, determination of weights for respective vehicles 140 is, in this example, subject to the constraints that:

$$\Sigma_i \text{weight}_{vehicle_i} = 1. \quad (3)$$

and, for each proximate vehicle 140, i.e., each vehicle$_i$, $$\text{weight}_{vehicle_i} \geq 0 \quad (4)$$

Thus, the weight$_i$ assigned to each vehicle 140 is determined relative to the weights of all other proximate vehicles 140, and is non-negative, but could be zero.

Weights may be assigned based at least in part on a location of a proximate vehicle 140 relative to the vehicle 105. For example, typically a greatest weight should be given to a vehicle 140 immediately preceding the vehicle 105, i.e., an immediately to-the front vehicle 140, with no intervening vehicles 140. Further a greater weight is typically given to vehicles 140 in a same lane as the host vehicle 105. Therefore, assuming that a vehicle 105 is in a lane 135 of with adjacent lanes 135 for travel in a same direction, default or base weights could be as follows:

TABLE 1

| Proximate Vehicle | Weight |
|---|---|
| Front, same lane | .4 |
| Rear, same lane | .3 |
| Left adjacent lane | .15 |
| Right adjacent lane | .15 |

Default or base weights can be adjusted by a computer 110 depending on vehicle 105 velocity, relative velocities of proximate vehicles 140, and the environmental factor. For example, the following rules could apply to adjusting weights for a vehicle$_i$:

If vehicle is relatively close (typically in terms of longitudinal distance to the host vehicle 105, then $\vec{\Delta d_i}$ is relatively small and weight$_{vehicle_i}$ is relatively high.

If vehicle$_i$ is relatively far from the host vehicle 105, then $\vec{\Delta d_i}$ is relatively large and weight$_{vehicle_i}$ is relatively low.

If $\vec{\Delta v_i} > 0$ (vehicle$_1$ is coming closer to the host vehicle 105, i.e., $\vec{\Delta d_i}$ is decreasing, so collision risk increases), then weight$_{vehicle_i}$ increases.

If $\vec{\Delta v_i} \geq 0$ and $\vec{\Delta d_i}$<threshold, (vehicle$_1$ is coming closer to the host vehicle 105 and a collision is determined to be imminent), then weight$_{vehicle_i}$=1.

If $\vec{\Delta v_i}$<0 (vehicle$_i$ is moving away from the host vehicle 105, i.e., $\vec{\Delta d_i}$ is increasing so collision risk is decreasing), then weight$_{vehicle_i}$ decreases.

If $\vec{\Delta d_i}$>threshold then weight$_{vehicle_i}$=0, i.e., the vehicle 140 is too far away from host vehicle 105 to be given any weight.

In the above rules, whether vehicles 140, 105 are "relatively close" or "relatively far" from one another could be determined according thresholds determined according to empirical techniques, machine learning, etc. For example, a vehicle 140 weight$_i$ could default to a first value, if $\vec{\Delta d_i}$ is greater than a threshold distance, but could then be adjusted (i.e., increased) to a second value if $\vec{\Delta d_i}$ falls below the threshold, e.g., by a percentage. Weights of other vehicles 140 would then be decreased according to the above constraints (equations (3) and (4)), as discussed further below with respect to FIG. 3. Further gradations are possible, e.g., two or more thresholds could be established for comparison to $\vec{\Delta d_i}$ and respective weights for a vehicle 140 could be specified for each threshold, as also discussed further with respect to FIG. 3. Machine learning or other empirical techniques, could be used to establish the thresholds and weights.

The computer 110 may be programmed to determine the target velocity based in part on environmental conditions such as road friction, road curvature, visibility, road slope and road bank angle, etc. These example environmental conditions, each described in turn below, may be detected with data from sensors 115 and/or according to map data stored in a vehicle 105 computer 110, e.g., specifying features such as road curvature, slope (i.e., gradient), road bank angle, etc., according to global positioning system latitude and longitude coordinates or some other coordinate system specifying a location of road features.

Road friction is a measure of traction between a tire on the vehicle 105 and a road surface. As an example, road friction may be measured by determining a tire-road friction coefficient between the tire and the road surface. A tire-road friction coefficient may be determined in a variety of ways as are known, e.g., based on road luminance, measured by a camera sensor 115, based on data from a server via the network, based on data from vehicle 105 wheel encoders, based on communications from other vehicles, i.e., the vehicle-to-vehicle (V2V) communications, etc.

The tire-road friction coefficient typically ranges between 0 and 1. The closer the tire-road friction coefficient is to 1, the greater the friction (e.g., traction). The closer the tire-road friction coefficient is to 0, the more slippery the road 145. The tire-road friction coefficient is typically based on a road surface material and/or any substances (e.g., water, snow) on the road 145 surface. As an example, the vehicle 105, travelling at a specific velocity, may maintain traction with a road 145 having a dry asphalt surface and a friction coefficient of 0.7, and may be more likely to lose traction with a road 145 having an icy surface, and a friction coefficient of 0.25. The tire-road friction coefficient, in combination with other factors such as the velocities of proximate vehicles 140, can be used to determine a minimum stopping distance, i.e., a minimum distance in which the vehicle 105 is able to decelerate from the vehicle's 105 current velocity to a complete stop, and a maximum velocity that the vehicle 105 can travel without the tires skidding and/or slipping across the road 145 surface.

Road curvature may be measured by an angle (e.g., may be measured in degrees) and a radius (e.g., may be measured in feet (ft) or meters) of a bend or curve in a road 145. Road curvature for a portion of a road being traveled by the vehicle 105 can be provided from sensor 115 data analyzed in the computer 110 according to known techniques, from a remote computer, from V2V communications, according to map data, etc.

Visibility refers to a measure of a distance at which an object and/or light may be accurately discerned by sensors 115. Visibility can be measured from high resolution camera sensor 115 data using image processing techniques and/or fusion of camera and lidar sensor 115 data. Alternatively or additionally, visibility can be determined from historical data. For example, a reference object such as a road sign, traffic light, etc., may have been visible and decipherable under prior or normal conditions at a specified distance; if a current distance at which the reference object is visible is less, then there may be a degradation in visibility.

A road slope or gradient is an angle of the surface level of a road, relative to a horizontal plane. As an example, the road slope may be measured by determining the angle (e.g., in degrees or feet per mile) of the road slope. The greater the angle, the more likely it is that the vehicle 105 may not be able to maintain traction as the vehicle 105 ascends or descends the road slope.

A road bank angle is an angle at which the road 145 is inclined about the road's direction of travel (e.g., a direction in which vehicles 105, 140 travel along the road 145) with respect to the horizontal plane. As an example, the road bank angle may be measured by determining an angle of the road surface relative to the horizontal plane. The greater the angle (in degrees), the more likely it is that the vehicle 105 may not be able to maintain traction. Road slope and road bank angle can be determined by sensor 115 data, e.g., measuring and angle of inclination, from map data, V2V communications, a remote server, etc.

Figure 3:
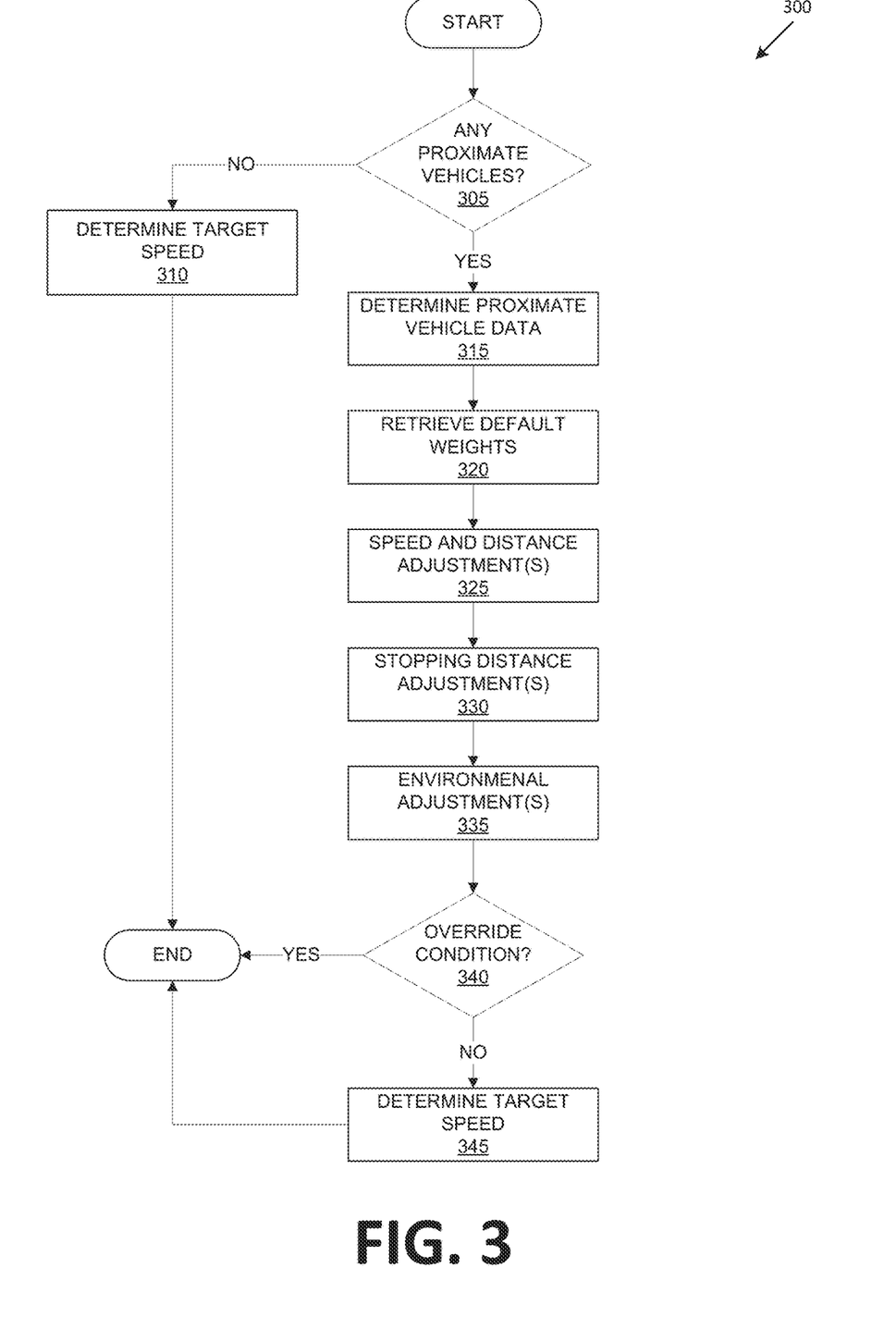
FIG. 3 is a flowchart of an exemplary process for determining a target velocity for a host vehicle.

FIG. 3 is a flowchart of an exemplary process 300 for determining a target velocity for a vehicle 105 based on proximate vehicles 140 and environmental conditions, and actuating the vehicle 105 to move at the target velocity. The process 300, blocks of which can be executed in an order different than that described herein and/or can be executed in combination with other processing, and/or by omitting certain processing described herein, can be executed according to programming in a vehicle computer 110.

The process 300 begins in a decision block 305, in which the computer 110 determines whether there are any vehicles proximate to the vehicle 105 based on sensor 115 data. If there are no vehicles 140 proximate to the host vehicle 105, the process 300 proceeds to a block 310. If there are one or more vehicles 140 proximate to the host vehicle 105, the process 300 proceeds to a block 315.

In the block 310, the computer 110 determines a target velocity for the vehicle 105 without any information about proximate to vehicles 140, e.g., according to user input, data about a posted speed limit, etc. The process 300 then ends following the block 310.

In the block 315, the computer 110 determines a lane, a velocity, and a longitudinal distance (i.e., distance measured along a direction of travel) relative to the host vehicle 105, of each proximate vehicle 140, e.g., based on sensor 115 data.

Next, in the block 320, the computer 110 retrieves default weights for each of the proximate vehicles 140 identified in the decision block 305. For example, default weights could be specified as described above with respect to Table 1. Moreover, fewer or more proximate vehicles 140 could be present then specified in Table 1. The computer 110 could store default weights for various combinations and numbers of proximate vehicles 140.

For example, Table 1 assumes that there is one respective vehicle 140 in each of two lanes to the immediate left and right of a lane of travel of the vehicle 105 within a predetermined longitudinal distance. However, a lane to the immediate left or right of a lane of travel of the vehicle 105 within the predetermined longitudinal distance could include two or more vehicles 140, in which case, different default weights could be assigned. For example, a weight assigned to an adjacent lane could be 0.15, and that weight could be divided equally among a number of vehicles in the lane within the predetermined longitudinal distance, e.g., each of two vehicles 140 would receive weights of 0.075.

Yet further for example, if a host vehicle 105 is traveling on a road with only a single lane in a direction of travel of the host vehicle 105, then the computer 110 could retrieve default weights for a rear proximate vehicle 140b and a forward proximate vehicle 140a, where the default weights satisfy the constraint of adding up to one, e.g., a forward vehicle 140a could have a weight of 0.7, and a rear vehicle 140b could have a weight of 0.3. Similarly, a host vehicle 105 could be traveling on a road with two lanes in a direction of travel of the host vehicle 105. In this example, a forward vehicle 140a could have a weight of 0.4, a rear vehicle 140b could have a weight of 0.3, and a vehicle 140 in a lane to the left or right could have a weight of 0.3. Again, as noted above, default weights discussed herein are merely exemplary, and in practice, default weights could be developed by empirical testing, simulations, etc., e.g., using techniques such as machine learning to determine what weights and weight combinations result in an optimal vehicle 105 speed, e.g., a maximum speed within posted speed limits and/or determined safe speed.

Following the block 320, and a block 325, the computer 110 adjusts the default weights retrieved in the block 320 according to relative speeds and/or longitudinal distances of respective proximate vehicles 140. These weight adjustments can be made, e.g., according to rules such as specified above. For example, specific implementations of rules could include:

Rule 1. If a longitudinal distance of a vehicle 140 immediately ahead of or behind the host vehicle 105 in a same lane as the host vehicle 105 is below a predetermined first distance threshold, then set the weight of that vehicle 140 to one, and all other weights to zero. If the condition specified in this rule is met, then typically none of the other rules listed below would then be considered. If each of a forward and a rear vehicle 140a, 140b are within the predetermined first distance threshold, the computer 110 could be programmed to give priority to one of these, e.g., to set the weight assigned to the forward vehicle 140a to one. The predetermined first distance threshold can be speed-dependent, e.g., the computer 110 could store a table or the like specifying respective safety distance thresholds for respective speed ranges of the vehicle 105. For example, if a vehicle 105 speed is less than 15 kilometers per hour, then a safety distance threshold of two meters could be appropriate, whereas at a vehicle speed of greater than 15 kilometers per hour, a higher safety distance threshold would be appropriate.

Rule 2. If a longitudinal distance of a vehicle 140 immediately ahead of or behind the host vehicle 105 in a same lane as the host vehicle 105 is above the predetermined safety (first) distance threshold, but less than a second distance threshold, then the weight assigned to that vehicle 140 is increased, and weights assigned to other vehicles 140 are reduced (typically proportionally). This rule further typically specifies that the weight increase depends on both of the speed of the host vehicle 105 and the longitudinal distance between the vehicles 105, 140. For example, the computer 110 could store a table or the like specifying the second distance threshold for various speed ranges. The computer 110 could then be programmed to increase a weight of the vehicle 140 within the second distance threshold by a specified amount, e.g., a percentage, e.g. as determined by empirical testing, simulation, etc. Weights assigned to other proximate vehicles 140 would then be proportionally reduced. Further, if each of a forward and rear vehicle 140a, 140b in a same lane as the vehicle 105 are within the second distance threshold, then the percentage increase due from being within the second distance threshold could be divided between the front and rear vehicles 140a, 140b, e.g., equally, other proximate to vehicles 140 having their weights proportionally reduced.

Rule 3. If a speed of a vehicle 140 in a lane adjacent to the host vehicle 105 is less than the current speed of the host vehicle 105 by more than a first speed difference threshold, then the vehicle 140 in the adjacent lane is assigned a weight of zero. The reason for this rule is that if vehicle 105, 140 speeds vary by a large amount to, then it is likely that traffic conditions are different in adjacent lanes, and a speed of a vehicle 140 in the adjacent lane is not relevant to the vehicle 105. For example, a vehicle 140 in an adjacent lane could be slowed by an exit ramp, an intersection, etc., and the vehicle 105 may be in a lane not affected by such conditions. However, implementation of this rule typically further includes a second speed difference threshold that is greater than the first speed difference threshold, wherein if the speed of a vehicle 140 in the adjacent lane is less than the speed of the host vehicle 105 by more than the second speed difference threshold, then this rule is not applied, i.e., the vehicle 140 in the adjacent lane is not assigned a weight of zero based on the first speed difference threshold. The reason for implementing the second speed difference threshold is that, if a difference in speeds of vehicles 105, 140 in adjacent lanes is too great, that difference may be unsafe, and therefore the target speed of the vehicle 105 should take into account much slower speeds of vehicles 140 in an adjacent lane.

Rule 4. If a longitudinal distance of a vehicle 140 in a lane adjacent to a lane of travel of the host vehicle 105 is less than a third distance threshold, then the weight assigned to that vehicle 140 is increased. The third distance threshold may be the same or different from either of the first or second distance thresholds. Further, the third distance threshold may be established by simulation or empirical testing, may differ according to a speed or range of speeds of the host vehicle 105, and can be stored in a table or the like in the computer 110. This rule typically is only considered if none of Rules 1-3 described above have resulted in adjustments to weights of vehicles 140 in a same lane as the vehicle 105. However, it is also possible that increasing weights of one or more vehicles 140 in adjacent lanes could result in proportional decreases to weights assigned to vehicles 140 in a same lane as the vehicle 105.

Rule 5. If a longitudinal distance of a vehicle 140 in any lane is greater than a third distance threshold, then the weight assigned to that vehicle 140 is reduced. As above, the third distance threshold could be determined by empirical testing, simulation, etc., and could be stored in a table or the like and based on vehicle 105 current speed. Further, different distance thresholds could be associated with different proportional weight reductions and/or assigned based on whether a vehicle 140 is in a same or different lane than the vehicle 105, in a lane to the left or right, etc.

Continuing the description of the process 300, following the block 325, in a block 330, the respective weights assigned to vehicles 140 output from the block 325 can be adjusted according to a determined stopping distance. Environmental data such as the examples provided above can be used to determine a stopping distance of the host vehicle 105, which can then be compared to a distance of an immediately forward vehicle 140a. If the stopping distance is greater than or equal to, or typically, not more than a predetermined amount less than, the distance to the immediately forward vehicle 140a, then the computer 110 can set the weighting of the forward vehicle 140a to one, other vehicles then going to zero. For example, as the predetermined amount could be specified to provide a safe margin of error for a stopping distance, e.g., to prevent a rear-end collision between the host vehicle 105 and an immediately preceding vehicle 140a, the safe margin of error being determined for various speeds or speed ranges of the vehicle 105 based on empirical testing, simulation, etc. Alternatively or additionally, if a rear vehicle 140b is within a predetermined distance, that vehicle 140b could be given more weight. Further, weight assigned to a forward vehicle 140a can be zero when the forward vehicle 140a is beyond a stopping distance of the vehicle 105, i.e., so far away that the host vehicle 105 can come to a complete stop even if the forward vehicle 140a suddenly or instantaneously stops (i.e., the forward vehicle 140a in this context is regarded as a stationary object at its present location). The reason for the latter rule is that forward vehicles 140a so far ahead of the vehicle 105 as to not factor in the stopping distance of the vehicle 105 are far enough away as to likely be irrelevant to determining a target speed for the vehicle 105.

Further, the weight of an immediately forward vehicle 140a could be adjusted based on the stopping distance according to various speed thresholds, where a greater adjustment is provided where the difference between an actual distance between vehicles 105, 140 and the determined stopping distance of the vehicle 105 is less than a threshold. For example, in the example of Table 2, the first threshold is smaller than the second, the second smaller than the third, and the third smaller than the fourth, possible adjustments to the weight assigned to the forward vehicle 140a (weights of other vehicles 140 then being proportionally reduced) possibly being as follows:

TABLE 2

| Act'l.-Stp. Dist. | % Adj. |
|---|---|
| <$threshold_1$ | 80 |
| <$threshold_2$ | 60 |
| <$threshold_3$ | 40 |
| <$threshold_4$ | 20 |

In a block 335, following the block 330, the computer 110 can determine an environmental conditions adjustment factor (or environment factor). As noted above, the environment factor can be used to take into account degraded environmental conditions in setting the target speed for the host vehicle 105. For example, conditions such as those mentioned above, e.g., road curvature, road friction, road slope, road bank angle, and visibility, etc., can be taken into account. The environment factor can be specified in terms of a percentage by which a weight assigned to a proximate vehicle 140 immediately preceding the host vehicle 105 in a same lane. Alternatively, the environment factor could be a percentage to be applied to the target speed determined according to prior blocks of the process 300, a final target speed being obtained upon application of this percentage.

For example, the computer 110 can store a table or the like specifying percent adjustments to the immediately preceding proximate vehicle 140 weight (i.e., respective environment factors) associated with various environmental conditions and/or combinations of environmental conditions. In this example, a table or the like in the computer 110 memory could specify an environment factor of zero, i.e., no adjustment to the weight assigned to the immediately preceding vehicle 140, where no environmental degradation was present. In a simple example, if the only environmental condition being considered was road curvature, a substantially straight road would result in an environment factor of zero or no adjustment, larger environment factors being applied as road curvature increases. For example, Tables 3 and 4 below show possible weight adjustments that could be made based on road curvature and road friction, respectively; similar examples could be provided with respect to other environmental conditions. Further, environment factors could be combined to provide a combined environment factor, e.g., applicable percentages from Tables 3 and 4 could be averaged or otherwise combined to adjust a weight of a forward vehicle 140a.

TABLE 3

| Radius of Curve | % Adj. of the weight of an immediately forward vehicle 140a |
|---|---|
| <$threshold_1$ | 110 |
| <$threshold_2$ | 120 |
| <$threshold_3$ | 130 |
| <$threshold_4$ | 140 |

TABLE 4

| tire-road friction coefficient ($\mu$) | % Adj. of the weight of an immediately forward vehicle 140a |
|---|---|
| <$threshold_1$ | 110 |
| <$threshold_2$ | 120 |
| <$threshold_3$ | 130 |
| <$threshold_4$ | 140 |

Following the block 335, the computer 110 executes a block 340, in which a determination is made concerning whether an override condition exists. An override condition is a determination that a risk of danger to the vehicle 105 must be addressed in lieu of setting the vehicle 105 target speed according to speeds of proximate vehicles 140 and environmental conditions. Typically an override condition is specified to be triggered based on data indicating that the vehicle 105 is likely to experience or is at high risk of an imminent collision. An override condition can be determined based on, for example, one or more of a vehicle 105 collision avoidance system indicating an imminent collision or risk thereof, a weight assigned to any vehicle 140 exceeding a predetermined threshold, e.g., 0.9, etc. If an override condition is determined, then the process 300 ends, e.g., to allow a vehicle 105 collision avoidance system and/or human operator to implement steps to mitigate or obviate a risk. Otherwise, the process 300 proceeds to a block 345.

In the block 345, the computer 110 determines the target speed for the vehicle 105, e.g., according to equation (1) above, using weights assigned and/or adjusted as described herein. Alternatively, equation (1) could be modified to include a separate environment factor as described above. Further, the computer 110 can send a command to vehicle 105 actuators to implement the target speed, i.e., operate the vehicle 105 to achieve and/or maintain the target speed. Following the block 345, the process 300 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers such as the computer 110 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computer is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, comprising: in a first vehicle, assigning respective weights to each of a plurality of second vehicles according to a respective location relative to the first vehicle of each second vehicle; identifying one of the second vehicles as an immediately forward vehicle, and increasing the weight assigned to the immediately forward vehicle based on at least one of the curvature of the road, the gradient of the road, the bank angle of the road, visibility, or a coefficient of friction on the surface of the road; and controlling a first vehicle velocity based on respective velocities of the plurality of second vehicles and at least one of a curvature of a road, a gradient of the road, a bank angle of the road, visibility, or a coefficient of friction on a surface of the road, including adjusting a target speed of the first vehicle according to the respective velocities of the second vehicles, each adjusted by the respective weight assigned to each respective second vehicle.

2. The method of claim 1, further comprising determining a first vehicle velocity target further based on a location of one of the second vehicles in addition to the immediately forward vehicle relative to the first vehicle.

3. The method of claim 1, further comprising increasing the weight assigned to the immediately forward vehicle based on at least two of the curvature of the road, the gradient of the road, the bank angle of the road, visibility, or a coefficient of friction on the surface of the road.

4. The method of claim 1, wherein each of the second vehicles are in a same lane as the first vehicle.

5. The method of claim 1, wherein one second vehicle is in a same lane as the first vehicle and another second vehicle is in a different lane than the first vehicle.

6. The method of claim 1, wherein the first vehicle velocity is controlled according to the target speed determined by the following equation: target speed=$\Sigma i{-}1$ to n $speed_{vehicle_i}*weight_{vehicle_i}$ wherein i specifies a number of second vehicles, $speed_{vehicle_i}$ represents the speed of an ith second vehicle, and $weight_{vehicle_i}$ is the weight assigned to the ith second vehicle.

7. The method of claim 1, further comprising identifying one of the second vehicle as being in an adjacent lane, and setting the weight assigned to the identified second vehicle in the adjacent lane to zero upon determining that a difference between a speed of the first vehicle and a speed of the identified second vehicle exceeds a predetermined threshold.

8. A computer comprising a processor and a memory, the memory storing instructions executable by the processor for: in a first vehicle, assigning respective weights to each of a plurality of second vehicles according to a respective location relative to the first vehicle of each second vehicle; identifying one of the second vehicles as an immediately forward vehicle, and increasing the weight assigned to the immediately forward vehicle based on at least one of the curvature of the road, the gradient of the road, the bank angle of the road, visibility, or a coefficient of friction on the surface of the road; and controlling a first vehicle velocity based on respective velocities of the plurality second vehicles and at least one of a curvature of a road, a gradient of the road, a bank angle of the road, visibility, or a coefficient of friction on a surface of the road, including adjusting a target speed of the first vehicle according to the respective velocities of the second vehicles, each adjusted by the respective weight assigned to each respective second vehicle.

9. The computer of claim 8, the instructions further comprising instructions for determining a first vehicle velocity target further based on a location of one of the second vehicles in addition to the immediately forward vehicle relative to the first vehicle.

10. The computer of claim 8, wherein each of the second vehicles are in a same lane as the first vehicle.

11. The computer of claim 8, wherein one second vehicle is in a same lane as the first vehicle and another second vehicle is in a different lane than the first vehicle.

12. The computer of claim 8, wherein the first vehicle velocity is controlled according to the target speed determined by the following equation: target speed=$\Sigma$i-1 to n $speed_{vehicle_i}$*$weight_{vehicle_i}$ wherein i specifies a number of second vehicles, $speed_{vehicle_i}$ represents the speed of an ith second vehicle, and $weight_{vehicle_i}$ is the weight assigned to the ith second vehicle.

13. The computer of claim 8, the instructions further comprising instructions for identifying one of the second vehicle as being in an adjacent lane, and setting the weight assigned to the identified second vehicle in the adjacent lane to zero upon determining that a difference between a speed of the first vehicle and a speed of the identified second vehicle exceeds a predetermined threshold.

14. The computer of claim 8, the instructions further comprising instructions for increasing the weight assigned to the immediately forward vehicle based on at least two of the curvature of the road, the gradient of the road, the bank angle of the road, visibility, or a coefficient of friction on the surface of the road.

* * * * *

UNITED STATES PATENT AND TRADEMARK OFFICE
CERTIFICATE OF CORRECTION

PATENT NO. : 10,703,373 B2  
APPLICATION NO. : 16/111658  
DATED : July 7, 2020  
INVENTOR(S) : Raveen Fernando et al.

Page 1 of 1

It is certified that error appears in the above-identified patent and that said Letters Patent is hereby corrected as shown below:

In the Claims

Column 14, in Line 60, Claim 6 replace "$speed_{vehicle_i} * weight_{vehicle_i}$" with — $speed_{vehicle_i} * weight_{vehicle_i}$, —

Column 14, in Line 61, Claim 6 replace "represents the speed of an ith" with — represents the speed of an $i_{th}$ —

Column 14, in Line 63, Claim 6 replace "the ith second vehicle." with — the $i_{th}$ second vehicle. —

Column 16, in Line 9, Claim 12 replace "$speed_{vehicle_i} * weight_{vehicle_i}$" with — $speed_{vehicle_i} * weight_{vehicle_i}$, —

Column 16, in Line 10, Claim 12 replace "represents the speed of an ith" with — represents the speed of an $i_{th}$ —

Column 16, in Line 12, Claim 12 replace "the ith second vehicle." with — the $i_{th}$ second vehicle. —

Signed and Sealed this  
Fifteenth Day of December, 2020

Andrei Iancu  
*Director of the United States Patent and Trademark Office*